(12) United States Patent
Maurer

(10) Patent No.: US 6,483,651 B1
(45) Date of Patent: Nov. 19, 2002

(54) LIGHTED MAGNIFYING DEVICE INCORPORATING A LIGHT EMITTING DIODE

(76) Inventor: Scott D. Maurer, 16 Hidden Valley, Rockey River, OH (US) 44116

( * ) Notice: Subject to any disclaimer, the term of this patent is extended or adjusted under 35 U.S.C. 154(b) by 0 days.

(21) Appl. No.: 09/851,719

(22) Filed: May 9, 2001

(51) Int. Cl.[7] .............................. G02B 7/02; G02B 27/02
(52) U.S. Cl. ....................................... 359/819; 359/802
(58) Field of Search ................................ 359/802, 803, 359/808, 809, 819, 822

(56) References Cited

U.S. PATENT DOCUMENTS

| 889,352 A | 6/1908 | Bold .......................... 359/808 |
|---|---|---|
| 1,884,968 A | 10/1932 | Bloch ......................... 359/803 |
| D248,401 S | 7/1978 | Del Pesco, Sr. ........... D16/135 |
| 4,577,927 A | 3/1986 | Raney ........................ 359/803 |
| 4,763,986 A | 8/1988 | Sego ........................... 359/798 |
| 5,517,278 A * | 5/1996 | Takahara et al. ............ 354/471 |
| 5,642,234 A | 6/1997 | Altman et al. ............... 359/802 |
| 5,760,849 A * | 6/1998 | Omae et al. .................... 349/5 |
| 5,883,860 A | 3/1999 | McKay .......................... 368/10 |
| 5,929,954 A * | 7/1999 | Omae et al. .................... 349/5 |
| 5,937,681 A | 8/1999 | Myhr et al. ............. 128/207.15 |
| 5,956,985 A | 9/1999 | Chang ....................... 70/456 R |
| 5,967,643 A | 10/1999 | Chan .......................... 362/208 |

* cited by examiner

Primary Examiner—Ricky Mack
(74) Attorney, Agent, or Firm—Hahn Loeser & Parks, LLP; Eryn R. Ace, Esq.

(57) ABSTRACT

A magnifying lens apparatus containing a magnifying lens mounted to a support housing. The apparatus contains at least one light emitting diode lamp to provide at least some illumination to an object being magnified by the magnifying lens. The LED lights may be of various colors. The lens may be pivoted or slid away from the housing to assist with viewing objects or texts. The apparatus may also include a means for retaining the lens in one position. The retaining means may be used to keep the lens from accidentally pivoting or sliding away from the housing when not in use or from pivoting or sliding into a closed position when the device is in use. The apparatus of the present invention may also include multiple magnifying lenses.

20 Claims, 6 Drawing Sheets

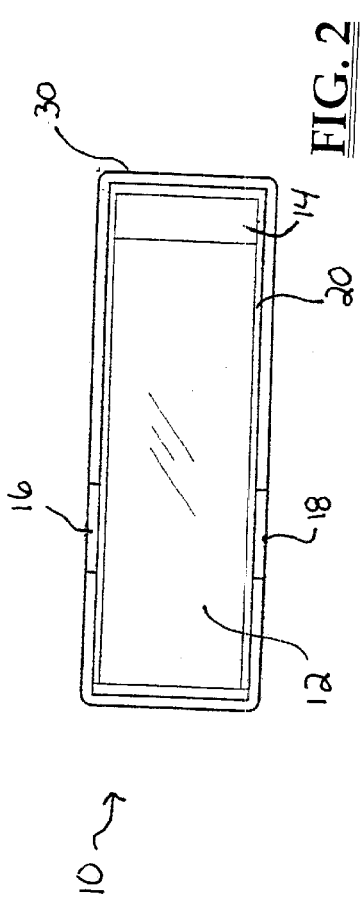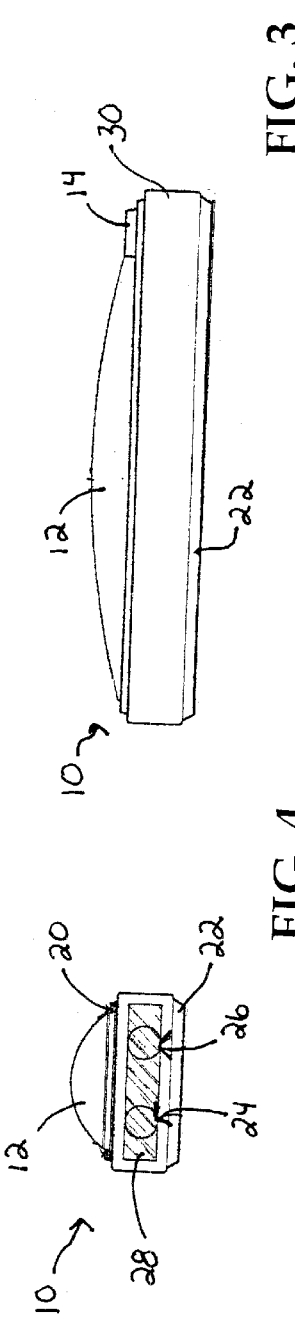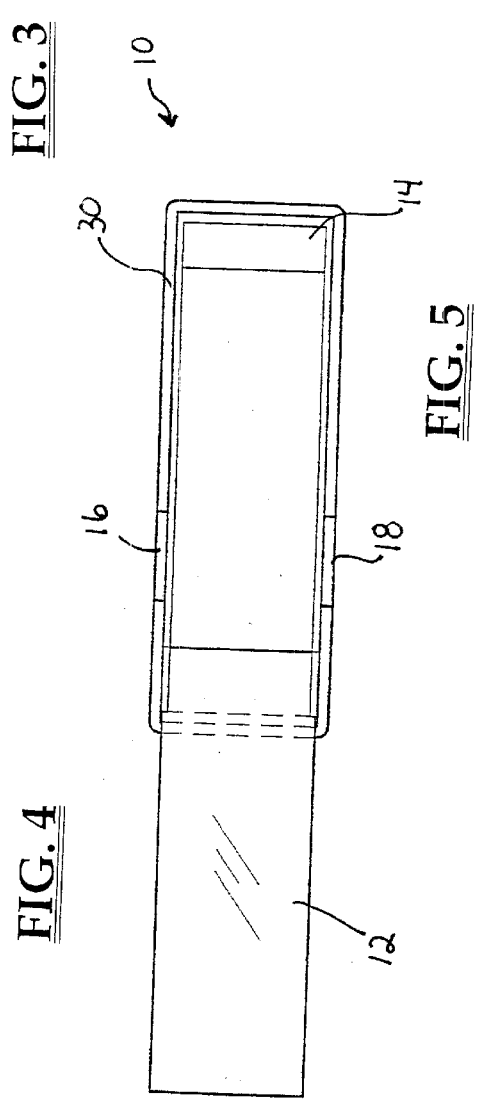
FIG. 2
FIG. 3
FIG. 4
FIG. 5

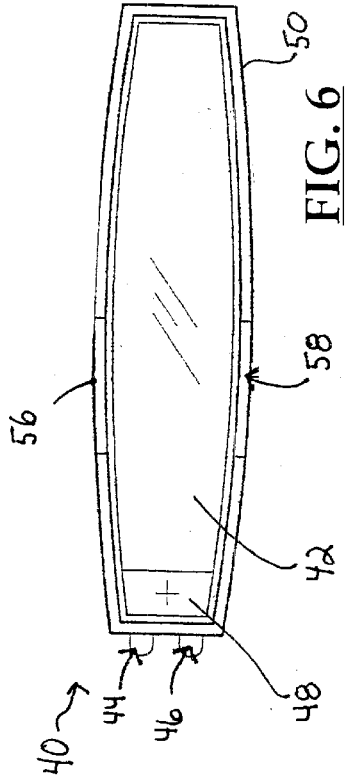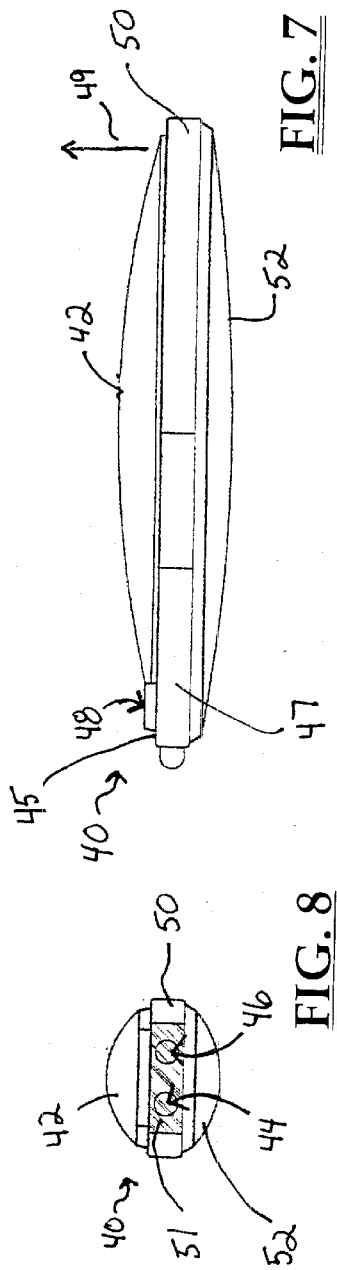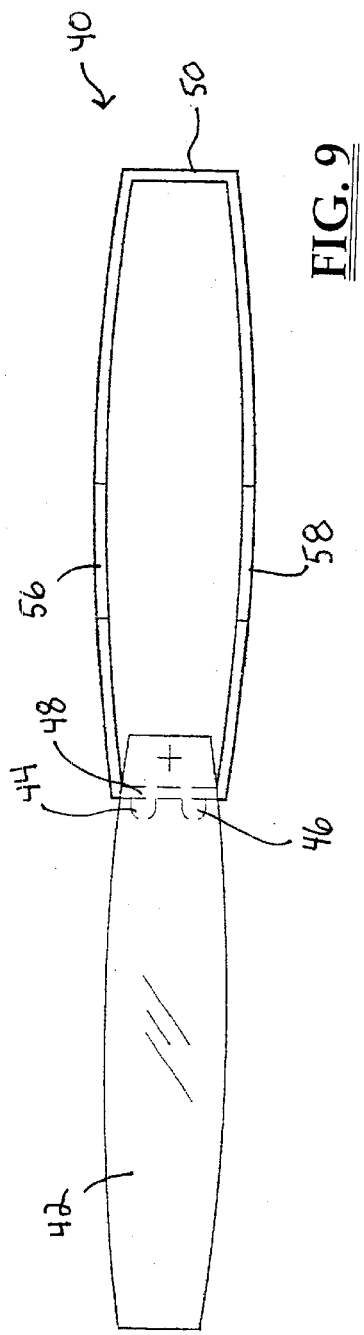

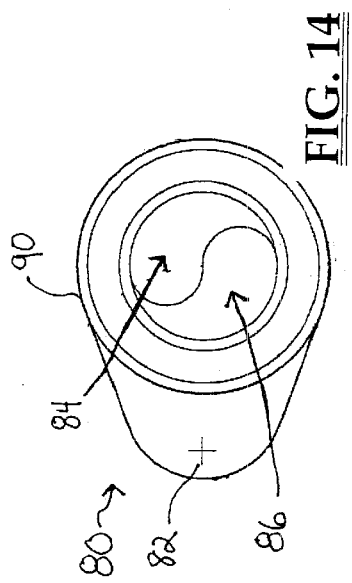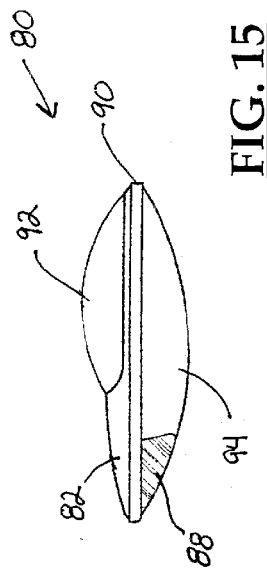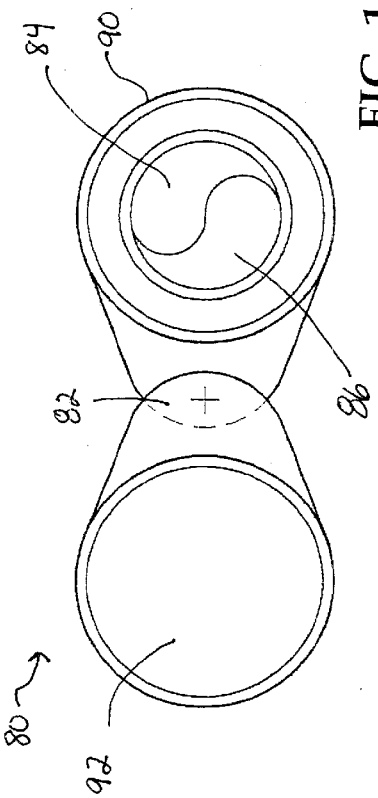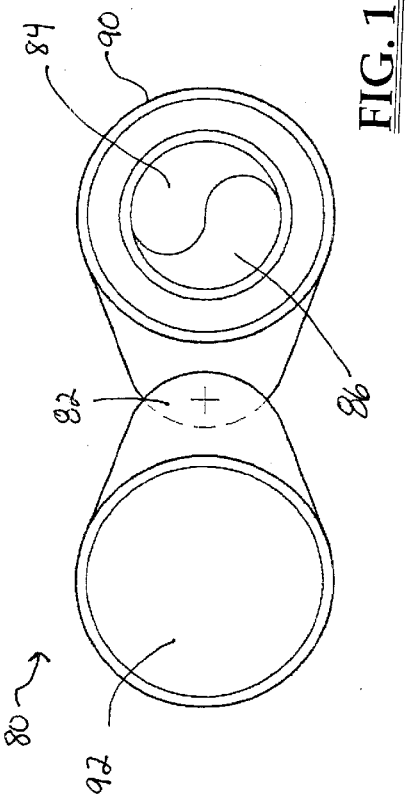

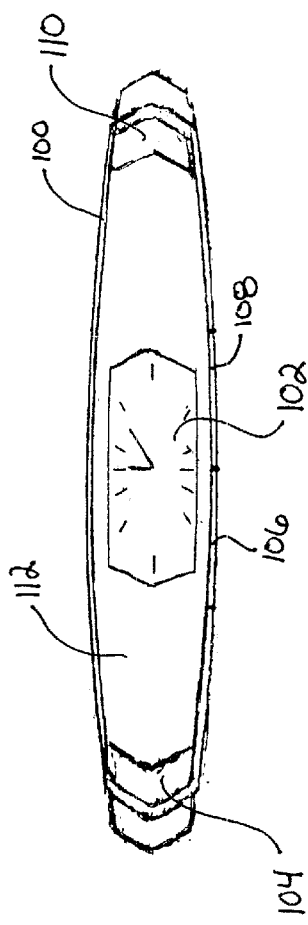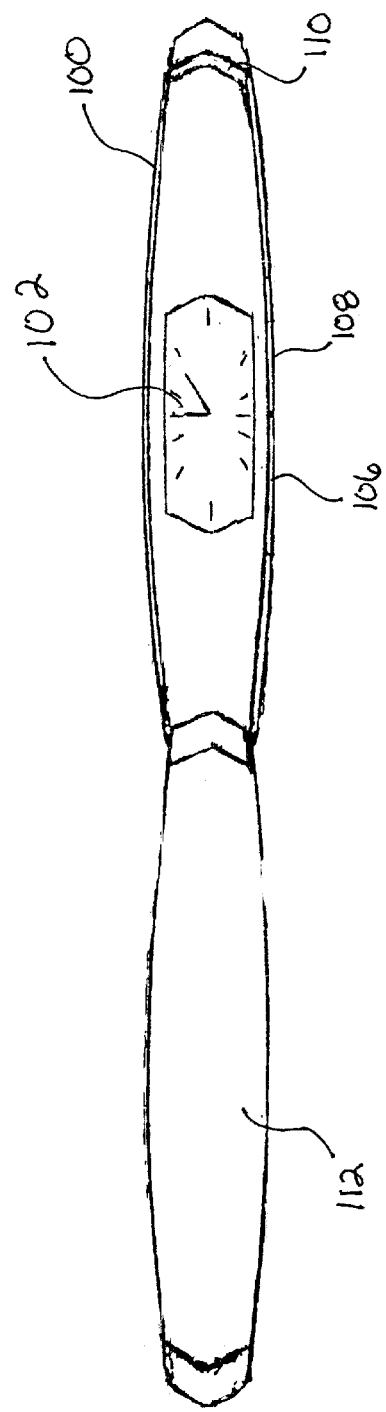
FIG. 18
FIG. 19

LIGHTED MAGNIFYING DEVICE INCORPORATING A LIGHT EMITTING DIODE

BACKGROUND

Magnifying devices are often used by people with poor or deteriorating vision to assist with seeing or inspecting small objects or for reading printed material. People with poor vision often need to carry a magnifying device with them for help with reading everyday items such as newspapers, menus or other documents. Even people with normal vision may need assistance with reading finely printed materials or viewing smaller details of objects. Thus, there is a need to provide a portable magnifying device that is easily and conveniently transported, such as by being attached to items that a person wears or carries on a regular basis.

Further, often, individuals must read printed materials or inspect objects in a darkened environment. This makes viewing difficult, even for people with good vision. Thus, it would be beneficial to have a magnifying device with a means for shining light on the object or text to be viewed through the magnifying lens.

Typical beam lights used in small flashlights and similar devices use an incandescent bulb and a parabolic reflective surface to create a column of light for illumination. These bulbs radiate a sphere of light such that a substantial amount of the light is reflected off of the reflective surface. The drawbacks associated with these types of bulbs are that they are relatively inefficient in terms of energy consumption, which increases operating costs for the devices. Another reason for increased operating costs is that the batteries or other power source must be replaced or recharged often. In addition, such bulbs are easily broken due to shock and the life of the bulb can be shortened by ambient temperature extremes or vibrations.

In recent years, semiconductor light emitting diode ("LED") lamps have come into use in flashlights and other applications. LED's are typically constructed of gallium arsenide (GaAs), gallium arsenide phosphide (GaAsP) gallium phosphide (GaP), or gallium nitride (GaN). An LED consists of a semiconductor chip having a p-n (positive-negative) junction. The p region consists primarily of positive charges, while the n region consists of negative charges. The junction barrier between the two regions prevents the flow of charges between the two regions. When a voltage is applied to the chip, electrons cross over the junction from the negative side to the positive side. When an electron nears a positive charge, forces of attraction cause the opposite charges to re-combine. This process is also referred to as "electron-hole recombination". An electron makes a transition to a lower energy level, thus releasing energy. The electronhole recombination which occurs across the junction results in electroluminescence or light emitted by the electronic excitation of a material. The LED light operates on a low current and a negligible amount of heat is produced. The LED lamp is encased in a clear epoxy resin material. The use of LED light sources eliminates some of the problems associated with incandescent lamps such as entrapped heat, limited lamp life and high energy consumption. LED's are capable of delivering one hundred percent of their released energy as light, while incandescent bulbs can waste more than ninety percent of their potential light by blocking it with a filter or lens. The color of an LED light is determined by the compound used in the semi-conductor chip. Multi-color LED's are created by combining various chips in an LED housing.

Although LED's of various colors have been known for quite some time, most designers and engineers still specify use of incandescent bulbs in many applications. One reason for this is that the benefits of LED's are not fully appreciated. Further, white light is often preferred for most lighting situations. However, white LED lights were not produced until recently. White light is produced by a mixing of various colors of light. The production of mixed colors from a single LED chip was not possible until recently. Researchers have recently converted a blue LED chip to generate white light. Despite these developments and the benefits of LED lights, LED lamps are rarely, if ever, used in common devices.

SUMMARY

The present invention includes a magnifying lens, a support housing to which said magnifying lens may be mounted, at least one light emitting diode lamp for illuminating an object or text being viewed with the magnifying lens, a power source for the light emitting diode lamp and a switch for activating/deactivating the light emitting diode lamp. The LED lamps are preferably white or red-orange light emitting diode lamps. The LED lamps may also include various other colors such as green, blue or yellow.

The switch is connected in a circuit between the LED lamp and the power source so that activation/deactivation of the switch turns the LED lamps on or off. In the embodiment of the invention where LED lamps of two or more different colors are used, the apparatus may be equipped with multiple switches.

In the present invention, the lens may be mounted to the housing by a variety of means such as slidable attachments or pivot hinges. The attachment for mounting the lens to the housing will allow the lens to move from a "closed" position to an "open" position. The "in use" position is generally the open position. When in use the lens may be in various positions relative to the housing. It may rotate or slide away from the lens in the same plane or it may rotate upwards and away from the housing. It is not precluded in the present invention to have the lens mounted to the housing so that it is in an a permanently "open" or "in use" position. However, the closed position will assist in protecting the lens from damage.

The magnifying lens apparatus of the present invention also includes a means for replacing or recharging the power source in the present invention. The means may include, but is not limited to a removable lower casing, a portion of the housing being removable or providing an outlet for connecting the power source to another power source for charging.

The apparatus of the present invention may also include multiple magnifying lenses mounted to a single housing. In addition, the magnifying lenses may be removable or replaceable.

The housing and lens apparatus may also be formed in various polygonal shapes, including but not limited to rectangular, square, round, triangular, oblong, pear shaped, or various other shapes. The shape of the device of the present invention should not be limited by the embodiments shown in the drawings herein.

BRIEF DESCRIPTION OF THE DRAWINGS

FIG. 2 is a front view of a first embodiment of the magnifying device of the present invention, showing the lens in a closed position.

FIG. 3 is a side view of the magnifying device of the present invention shown in FIG. 2.

FIG. 4 is an end view of the magnifying device of the present invention shown in FIG. 2.

FIG. 5 is a front view of the magnifying device of the present invention shown in FIG. 2, showing the lens in an open position.

FIG. 6 is a front view of a second embodiment of the magnifying device of the present invention, showing the lens in a closed position.

FIG. 7 is a side view of the magnifying device of the present invention shown in FIG. 6.

FIG. 8 is an end view of the magnifying device of the present invention shown in FIG. 6.

FIG. 9 is a front view of the magnifying device of the present invention shown in FIG. 6, showing the lens in an open position.

FIG. 14 is a front view of a fourth embodiment of the magnifying device of the present invention, showing the lens in a closed position.

FIG. 15 is a side view of the magnifying device of the present invention shown in FIG. 14.

FIG. 16 is an end view of the magnifying device of the present invention shown in FIG. 14.

FIG. 17 is a front view of the magnifying device of the present invention shown in FIG. 14, showing the lens in an open position.

FIG. 18 is a front view of a magnifying device of the present invention, showing the lens in a closed position.

FIG. 19 is a front view of a magnifying device of the present invention shown in FIG. 18, showing the lens in an open position.

DETAILED DESCRIPTION OF THE INVENTION

Figure 1B:
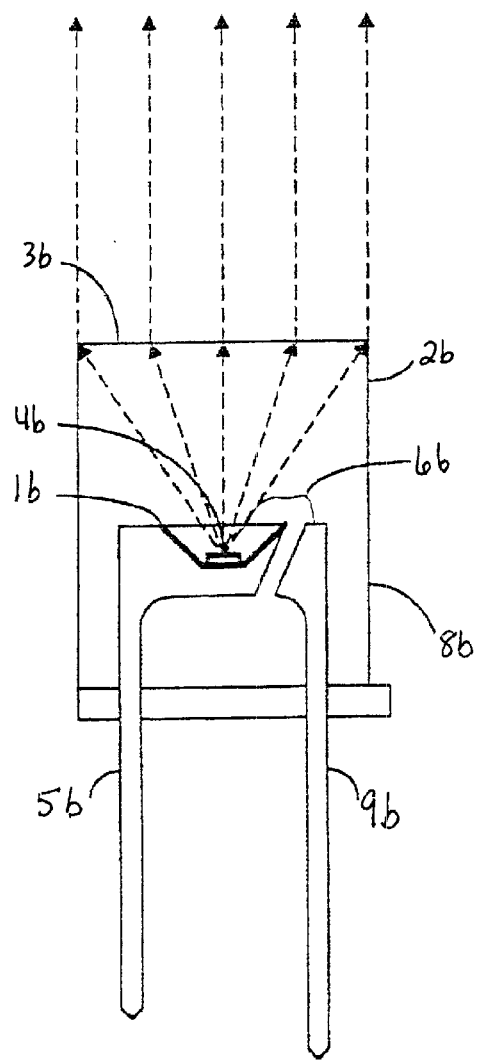
FIG. 1b illustrates a second typical LED light operation.

The present invention will be described herein with reference to the attached figures. It should be understood that although specific embodiments are shown in the drawings and described herein, variations of these embodiments are clearly within the scope of the present invention. For instance the shape, size and position of the housing, lens, lights, power buttons or other structures in the device of the present invention may be varied without departing from the scope of the present invention. Similarly, the materials used for constructing the lens, housing or any other components of the device described herein may be varied and still be encompassed by the scope of the claims herein.

Figure 1A:
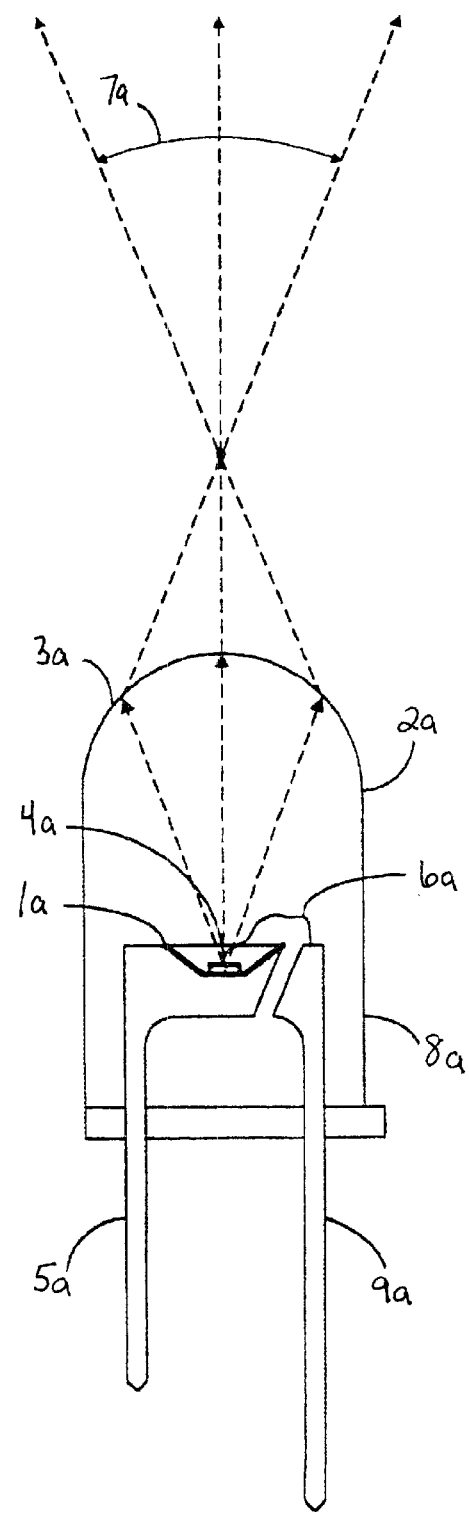
FIG. 1a illustrates a typical LED light operation.

FIG. 1a shows a sectional view of a conventional LED lamp having at least one semiconductor chip 1a. The lamp further has a transparent envelope 2a having a convex hemispherical shaped lens 3a at the end of the cylindrically shaped rod 8a. A semiconductor chip 1a is mounted on the conductive surface of the first electrode 5a, which is typically the LED anode. The chip 1a is mounted within the convex reflector 4a portion of the first electrode 5a. A fine wire 6a connects the end of the semiconductor chip 1a which is opposite the end attached to the electrode 5a to the second electrode 9a. The electroluminesence of the LED lamp shown in FIG. 1a produces a cone shaped light pattern 7a. The LED lamp produces a beam of visible light. The angle of the light beam varies depending on the particular design of the device.

FIG. 1b illustrates another conventional type of LED lamp having one or more semi-conductor chips 1b. The lamp comprises a transparent envelope 2b formed at an upper portion of a cylindrically shaped rod 8b. The transparent envelope 2b has a flat or top hat shaped lens 3b. A semiconductor chip 1b is mounted within a conductive surface of a first electrode 5b which is the LED anode of the lamp. The LED anode is in a recess within a convex reflector portion 4b. The end or surface of the chip 1b which is opposite the end of the chip 1b connected to the electrode 5b is connected to a wire 6b. The wire 6b connects the chip 1b to the second electrode 9b. The light that emanates from the semiconductor chip is projected onto the flat lens 3b. The LED lamp shown in FIG. 1b gives a uniform surface of illumination.

LED lamps as shown and described in relation to FIGS. 1a and 1b as well as other types of LED lamps may be used in the present invention. In the discussion below of the magnifier device of the present invention, the lighting portion will be referred to a simply "light" or "LED lamp". It should be understood that these terms cover any types of LED lights that may be used in devices as are described herein.

The device of the present invention comprises a housing, a magnifying lens, at least one LED lamp, means for operating the LED lamps, means for replacing power sources for the lamps. The devices also comprise means for moving the lens to an open or closed position and may include means for holding the lens in an open or closed positions. The device may also include a means for replacing batteries or another power source or recharging the power source. Each of these features will be described in more detail in relation to the specific embodiments of the present invention as shown in the drawings.

Turning now to FIG. 2, there is illustrated a front view of a first embodiment of the magnifying device of the present invention, generally designated 10. The lens 12 in the embodiment shown in FIG. 2 is in the closed position. The magnifying device 10 comprises a housing 30 which may be comprised of a variety of materials such as rigid plastic or various metals. In this embodiment, the lens 12 is slidably attached to the housing 30. The device includes a track 20 on each side of the housing. The track 20 may be comprised of metal or plastic slots or sleeves extending the length of each side of the housing 30. The sides of the length of lens 12 and track 20 are adapted to engage one another on each side of housing 30 so that lens 12 is capable of sliding within track 20 to move from the closed position shown in FIG. 2 to an open position shown in FIG. 5. The device further comprises a sliding lens retainer 14 at one end of the device to prevent the lens from slipping out of the closed position when the device is not in use. The retainer may frictionally hold the lens in place against the top surface of the housing. The retainer 14 may be any means capable of holding the lens in place such as a releasable clip, a snap closure, a latch, a magnetic retainer with a complimentary magnet attached to the lens, or one or more prongs which are preferably somewhat flexible so that the retainer may be secured and released easily.

The lens 12 of the present invention is preferably a spherical magnifying lens. The lens may be fabricated of glass, polycarbonate material, as well as various other plastics useful in making lenses. In this first embodiment, the lens has a rectangular shape with a spherical surface as is shown in FIGS. 3 and 4. As shown in FIG. 5, once the lens retainer 14 is released, the lens slides along the track 20 in sides of housing 30 to its open position. The apparatus may also include a plurality of lenses of different magnification powers. One lens at a time could be slid into the open position for use in magnifying text or an object.

The housing 30 also includes a lower casing 22 which houses the LED lights 24, 26 and a power source for the lights. In a preferred embodiment, the power source is an easily replaceable power source such as a battery. The power source may also be rechargeable. The housing 30 preferably has an opening or removable portion for replacing the batteries or other power source or the LED lamps when necessary. Further, the housing may have an outlet for recharging batteries or another power source.

One end of the housing has a transparent end region 28. The region may be an opening in the housing or may be covered with a transparent material such as a piece of glass or plastic. The transparent end region is not required to be clear and may be tinted in whole or in part to some extent. Alternatively, the LED lamp may be positioned on the outer surface of the housing.

At least one LED lamp is included in the device as shown in FIG. 4. The LED lamps may be chosen from a variety of types and colors. However, in a preferred embodiment, a white LED lamp 26 and a red-orange LED lamp 24 are used. The brightness of an LED light is determined by the power emitted by the LED light and the relative sensitivity of the eye at the wavelength emitted. Typically, maximum sensitivity occurs at 0.555 $\mu$m. This wavelength is in the yellow-orange and green region of the spectrum. Thus, the beam emitted from the red-orange LED light would be more visible to the eye, thus assisting a person using the device to see the desired object or text. This light assists the user in low light conditions. The use of two colors of LED lights can assist with viewing text or objects under various lighting conditions. It should be understood that LED lights of various colors can be used in the present invention. It should also be understood that incandescent lights may also be used in the present invention, although LED lights are preferred.

On each side of the housing, in this embodiment, there is a push button switch for activating the LED lights, red-orange LED push button 16 and a white LED push button 18. As the push button is pressed, a current runs from the power source to the LED, applying voltage across the LED's p-n junction to produce a beam of light.

In use, a user holds the device in its open position as shown in FIG. 5. The lens 12 portion is placed in front of the object or text that the user wants to view more clearly. If necessary and depending on the lighting conditions, the user will activate an LED light by pressing one or both of the push button activators 16, 18. The light will illuminate the object or text that the user wants to magnify for viewing. In one embodiment, constant pressure should be applied to the push button for the circuit to be activated and to produce a beam of light. In another embodiment, the device may be equipped with an on/off switch which with a single push or by moving the switch from one position to another, the light will turn on or off.

In all of the remaining embodiments described herein, the lens, LED lamps, and push buttons all are similar to the embodiment described in relation to FIGS. 2–5 with respect to materials, function and operation. The shape and configuration of the elements and the attachment of the lens to the housing are altered in subsequent embodiments.

FIGS. 6–9 illustrate a second embodiment of the invention. FIG. 6 shows a front view of the magnifying device of the present invention, generally designated 40. In this embodiment, the lens 42 is connected to the housing 50 by a pivot connection 48. The lens is preferably a spherical magnifying lens. The pivot connection may be a pin type hinge which allows the lens 42 to pivot rotationally about the hinge away from the housing 50 for use. The pin hinge may be parallel to the lens while the lens has a mounting portion having a C-shaped attachment which substantially fits around the hinge and is capable of rotating about the hinge. The lens mounting portion may also have an elbow bend between the end that is connected to the lens and the C-shaped attachment. The elbow bend will facilitate the lens pivoting upwards and away from the upper surface of the housing. Alternatively, the pin hinge may extend perpendicularly to the housing of the device. In this embodiment, the lens has a ring type attachment for the hinge, such that the ring rotates about the pin hinge. The hinge allows the lens 42 to pivot from the "closed" position as shown in FIG. 6 wherein the lens is substantially adjacent to the body of the housing 50 to an "open" position as shown in FIG. 9. In the present invention, any type of hinge that will allow the lens to pivot away from the housing may be used.

In the open position, the lens 42 is pivoted away from the housing to allow the user to conveniently use the device to magnify an object or text. It is contemplated that the pivot connection may allow the lens to rotate away from the housing in the same plane as the housing. Alternatively, the lens may pivot upwards and away from the housing in the direction indicated by arrow 49, to be used in a different orientation. In a preferred embodiment, the hinge allows the lens to pivot away from the housing so that the lens 42 and the housing 50 are at an angle of 90° to 180°. It is also contemplated that the device may be used at angles not within this range. In the alternative, the pivot hinge 48 may allow the lens to "flip" upwards to a position substantially perpendicular to the housing or any angle between 90° and 180°. The device may include a push button release latch, similar to one found in conventional pill boxes or the like to effect this "flip" opening.

As described above, this embodiment also includes one or more LED lamps, preferably, a red-orange LED 44 and/or a white LED 46. The housing includes transparent end region 51 through which a beam of light may be projected. In the alternative, the LED lamps may be mounted on the outer surface of housing. The device also includes switches for activating the LED lamps, 56, 58. The switches may be in the form of push-buttons. The housing also comprises a lower casing 52 which is removable for replacing or inserting batteries or another power source for the LED lights or the LED lights themselves. Alternatively, the housing may contain an outlet to allow recharging of the power source.

In use, the lens 42 is rotated away from the housing 50 to an angle either in the same plane as the housing or above the housing which is convenient for the user. In the embodiment shown in FIGS. 8 and 9, the LED lights are positioned in an end of the housing such that the optimal angle when the lens 42 is rotated up and away from the housing would be approximately between 90° and 180°. When the lens is rotated away from the housing in the same plane, the optimal angle is closer to 180°. At these angles, the light beam emanating from the LED lights would best illuminate the object to be magnified. However, other angles of the lens are also within the scope of the present invention. In addition, the position of the lights in the housing could be varied to be on a top surface 45 or side surface 47 of the housing so that light will project in various directions to accommodate other possible angles between the lens 42 and housing 50. The LED lamps mounted to the housing of the present invention may also be adjustable to accommodate other angles between lens and housing.

The device 40 may also comprise a means for securing the lens 42 into an open position. For instance, the hinge may be equipped with a lock or a brake to stop rotation of the lens at a certain point or to allow the user to place the lock or brake when the lens is in the desired position. In addition, with a pin hinge, the lens connecting portion may be serrated or have projections therein so that openings or depressions between the projections engage the hinge pin to hold the lens in one position. The hinge may be equipped with several projections therein so that the lens may be rotated away from the housing and "snapped" into place at various positions and angles away from the housing. The lens may additionally be held in place by frictional forces between the lens mounting portion and the hinge.

Further, the device may comprise a means for holding the lens in the closed position such as a clip, a snap closure, a latch a magnetic closure device or one or more prongs used to hold the lens in place. One way the retaining device may be used is to frictionally hold the lens in place against the surface of the housing to prevent the lens from accidentally slipping away from its closed position adjacent to the housing. The device may also be secured closed with an elastic band placed around the circumference of the device or a band of material which can be secured together at each end to hold the device in the "closed" position. The lens may also be held in the closed position due to frictional forces between the portion of the lens used to mount the lens onto the hinge and the hinge itself.

Figure 10:
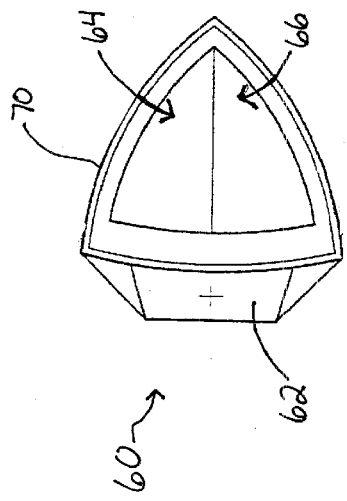
FIG. 10 is a front view of a third embodiment of the magnifying device of the present invention, showing the lens in a closed position.
Figure 11:
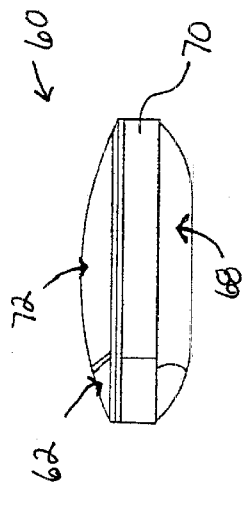
FIG. 11 is a side view of the magnifying device of the present invention shown in FIG. 10.
Figure 13:
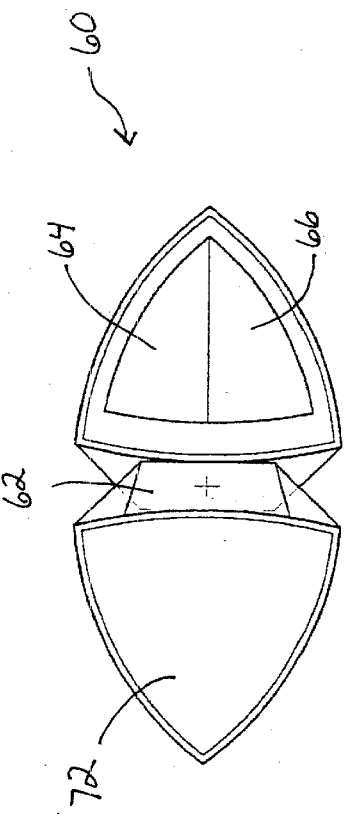
FIG. 13 is a front view of the magnifying device of the present invention shown in FIG. 10 showing the lens in an open position.

A third embodiment of the present invention is shown in FIGS. 10–13. This embodiment of the device, generally designated 60, has a triangular shape. As shown in FIG. 10, the housing 70 has a pivot hinge 62. The pivot hinge 62 in this embodiment operates in substantially the same way as the pivot member as described in reference to FIGS. 6–9 above, in that the lens pivots rotationally about the hinge away from the housing in the same plane or upwards and away from the housing.

Figure 12:
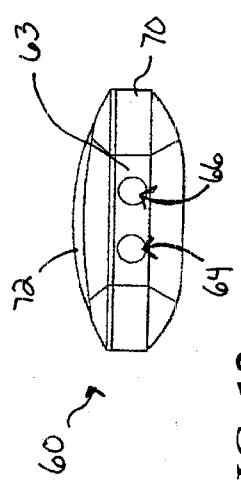
FIG. 12 is an end view of the magnifying device of the present invention shown in FIG. 10.

In this embodiment, the buttons 64, 66 for activating the LED lights are located on a surface of the housing. As shown in FIG. 10, when the lens 72 is in its closed position, the buttons 64, 66 are visible through the lens 72. The housing further comprises a removable bottom portion 68 for replacing the batteries or power source for the LED lights or the LED lamps themselves. The lower casing portion of the housing may also comprise an outlet for recharging the batteries or other power source. In this embodiment, the LED lamps 64, 66 are located in the housing at the end of the triangular portion away from the point of the triangle, although it should be understood that the LED lamps could be positioned elsewhere in or on the housing. The LED lamps as shown in FIG. 12, are positioned such that beams of light produced by the LED lamps project through a transparent region 63.

A fourth embodiment is shown in FIGS. 14–17. In this embodiment, generally designated 80, the housing 90 has a round shape. The buttons 84, 86 for activating the LED lights 96, 98 are located on a surface of the housing. When the lens 92 is in its closed position, the buttons 84, 86 are visible through the lens.

The housing comprises a pivot hinge 82 which allows the lens to pivot rotationally away from the housing. The housing further comprises a removable lower portion for replacing batteries or other power source for lights or the LED lamps themselves.

The third and fourth embodiments described above may contain similar lens retaining portions as were described in relation to the embodiment shown in FIGS. 6–9. Similar retaining devices may be used to hold the lens in an open or closed position.

In all of the embodiments described above, the bottom portion of the housing is not required to be removable to replace the power source. The housing may comprise an opening therein with a removable cover revealing a compartment for batteries or another power source. The housing may also include an outlet for recharging the power source. In addition, the LED bulbs may be replaceable. In an alternative embodiment, the entire device may be disposable when the bulbs burn out or the power source is exhausted. In a disposable embodiment of the device, it is contemplated that materials used for the housing, lens and other structures will likely be of a lower quality than those used for a reusable embodiment.

It should also be understood that the lens may be removable from the housing. In the event that the lens would break or crack, the lens could be replaceable or lenses of different magnifications could be attached to the housing for various purposes. In addition, several lenses could be mounted to the housing in the present invention. Each lens may have a different magnifying power and may be rotated to the open position for use.

In addition, the present invention may further be deigned to be carried by a person conveniently. For instance, the device may be small enough to fit into a wallet, pocket or purse. The device may also be adapted to be attached to a key ring, a compass, a watch, a ring, or as a pendant to a necklace or bracelet. Further, the housing itself could be a common device such as a timepiece. The timepiece may be a wrist watch, a pocket watch, or other types of watches, such as a ring watch. FIGS. 18–19 illustrate an embodiment of the present invention wherein the housing 100 is also a timepiece. The face of the watch 102 is on the upper surface of the housing 100. When the lens 112 is in its closed position as shown in FIG. 18, the lens 112 may be used to magnify the face of the watch. The device has a pivot hinge 104 which allows the lens 112 to rotate away from the housing, either towards a plane above the housing or rotate in the same plane as the housing. As with the other embodiments shown and described herein, the watch housing also comprises LED lamps (not shown). The housing is equipped with push buttons 106, 108 for activating LED lamps. A lens retainer 110 may also be used to hold the lens 112 in a closed position adjacent to the face of the watch 102.

The device may also be larger for use at home or in the office. In addition, devices such as this may be provided at restaurants, theaters, or stores for use by patrons. For instance, a restaurant or theater may provide the device upon request to a patron who is having trouble reading a menu or program. In a store, such as a jewelry store, the device may be provided to more closely inspect a piece of jewelry the patron is considering purchasing.

It should be understood that the present invention is not limited to the embodiments herein shown and described. Variations on these embodiments are contemplated by the present invention and covered by the claims.

What is claimed is:

1. A magnifying lens assembly comprising:

a magnifying lens;

a support housing for mounting and holding said magnifying lens, wherein said support housing comprises an upper surface, a lower casing, wherein said upper surface and said lower casing define a cavity in said support housing;

at least one light emitting diode lamp mounted to said support housing;

at least one power source connected to said at least one light emitting diode lamp;

at least one switch mechanism connected in a circuit between said light emitting diode lamp and said power source, said switch mechanism being activatable and deactivatable to turn on and off said at least one light emitting diode lamp;

said light emitting diode lamp positioned so as to direct illuminating light away from said magnifying lens so as to illuminate an object magnified by said magnifying lens.

2. The magnifying lens apparatus as recited in claim 1, further comprising:

a hinge for rotatably or pivotally mounting said magnifying lens to said support housing.

3. The magnifying lens apparatus as recited in claim 1, further comprising:

a hinge for rotatably mounting said magnifying lens to said support housing such that said lens rotates away from said upper surface of said support housing in substantially the same plane as said housing.

4. The magnifying lens apparatus as recited in claim 1, further comprising:

a hinge for rotatably mounting said magnifying lens to said support housing, such that said lens is capable of rotatably pivoting away from the support housing towards a plane above the upper surface of said support housing.

5. The magnifying lens apparatus as recited in claim 1, comprising:

a white light emitting diode lamp; and a red-orange light emitting diode lamp.

6. The magnifying lens apparatus as recited in claim 1, wherein said support housing comprises slide tracks disposed on opposite sides of said upper surface of said support housing.

7. The magnifying lens apparatus as recited in claim 6 wherein said magnifying lens comprises side edges adapted to engage said slide tracks.

8. The magnifying lens apparatus as recited in claim 1, further comprising:

a means for retaining the magnifying lens in a closed position.

9. The magnifying lens apparatus as recited in claim 8, wherein said retaining means is selected from the group consisting of clips, bands, latches, magnets, flexible prongs and snap closures.

10. The magnifying lens apparatus as recited in claim 1, further comprising:

a plurality of magnifying lenses mounted on said support housing.

11. The magnifying lens apparatus as recited in claim 10, further comprising:

a hinge for rotatably or pivotally mounting said magnifying lenses to said support housing.

12. The magnifying lens apparatus as recited in claim 1, wherein at least a portion of said lower casing of said support housing is removable for replacing said power source or said light emitting diode lamp.

13. The magnifying lens apparatus as recited in claim 1, wherein. said power source is a rechargeable power source.

14. The magnifying lens apparatus as recited in claim 1, wherein said apparatus is attached to a member of the group consisting of key rings, watches, necklaces, bracelets, rings, wallets, compasses, and purse straps.

15. The magnifying lens apparatus as recited in claim 1 wherein:

said support housing further comprises a transparent end region and said light emitting diode is oriented within said cavity in said support housing adjacent to said transparent end region so as to project a beam of light through said transparent end region toward an object magnified by said magnifying lens.

16. The magnifying lens as recited in claim 1 wherein said support housing is a watch.

17. A magnifying lens assembly comprising:

at least one magnifying lens;

a support housing for mounting and holding said magnifying lens, wherein said support housing an upper surface, a lower casing, wherein said upper surface and said lower casing define a cavity in said support housing;

a hinge for rotatably or pivotally mounting said magnifying lens to said support housing;

a light emitting diode lamp mounted within said cavity in said support housing;

a power source connected to said light emitting diode lamp;

a switch mechanism connected in a circuit between said light emitting diode lamp and said power source, said switch mechanism being activatable and deactivatable to turn on and off said light emitting diode lamp;

said support housing having a transparent end region; and said light emitting diode lamp being oriented within said cavity in said support housing adjacent to said transparent end region such that said light emitting diode lamp projects light through said transparent end region so as to direct illuminating light away from said magnifying lens to illuminate an object magnified by said magnifying lens when said switch mechanism is activated.

18. The magnifying lens apparatus as recited in claim 17 wherein said magnifying lens pivots away from said housing to an angle approximately 90° to 180°.

19. The magnifying lens apparatus as recited in claim 17 comprising:

a white light emitting diode lamp; and a red-orange light emitting diode lamp.

20. A magnifying lens assembly comprising:

at least one magnifying lens;

a support housing for mounting and holding said magnifying lens, wherein said support housing an upper surface, a lower casing, wherein said upper surface and said lower casing define a cavity in said support housing;

a white light emitting diode lamp mounted within said cavity in said support housing;

a red-orange light emitting diode lamp mounted within said cavity in said support housing;

a power source connected to said white light emitting diode lamp and said red-orange light emitting diode lamp;

a switch mechanism connected in a circuit between said white light emitting diode lamp and said power source, said switch mechanism being activatable and deactivatable to turn on and off said white light emitting diode lamp;

a switch mechanism connected in an electrical circuit between said red-orange light emitting diode lamp and said power source, said switch mechanism being activatable and deactivatable to turn on and off said red-orange light emitting diode lamp;

said white light emitting diode lamp and said red-orange light emitting diode lamp oriented within said cavity in said support housing such that said white light emitting diode lamp and said red-orange light emitting diode lamp project light so as to direct illuminating light away from said magnifying lens to illuminate an object magnified by said magnifying lens.

* * * * *